July 7, 1936. J. W. MORSE ET AL 2,046,528
AUTOMOBILE WHEEL ALIGNING DEVICE
Original Filed Dec. 31, 1929 4 Sheets-Sheet 4
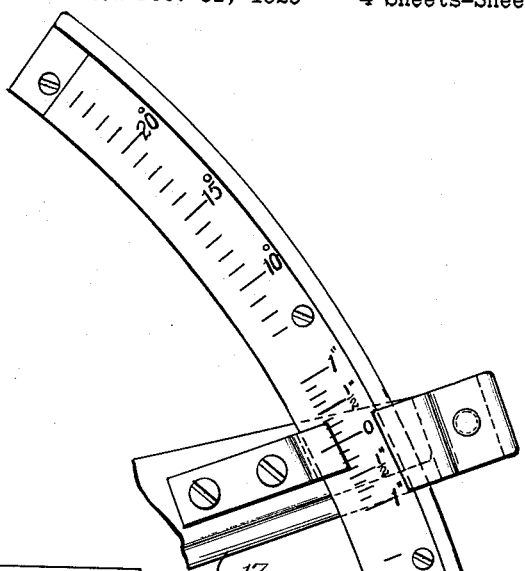
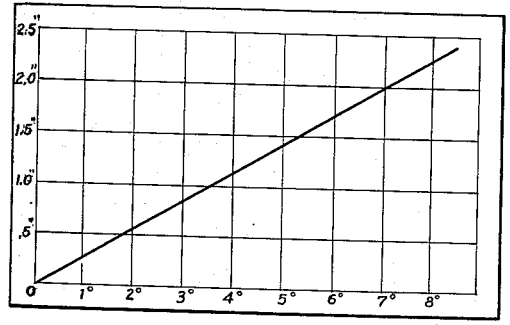
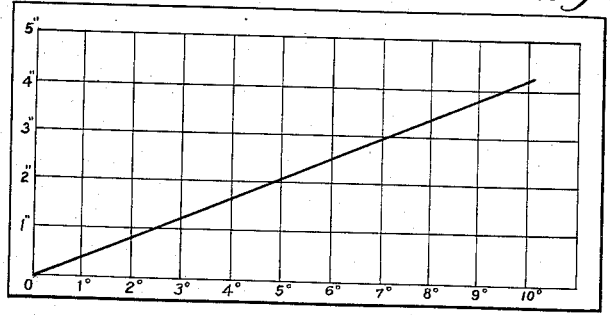
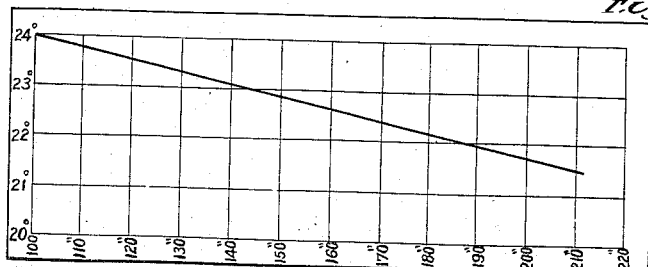

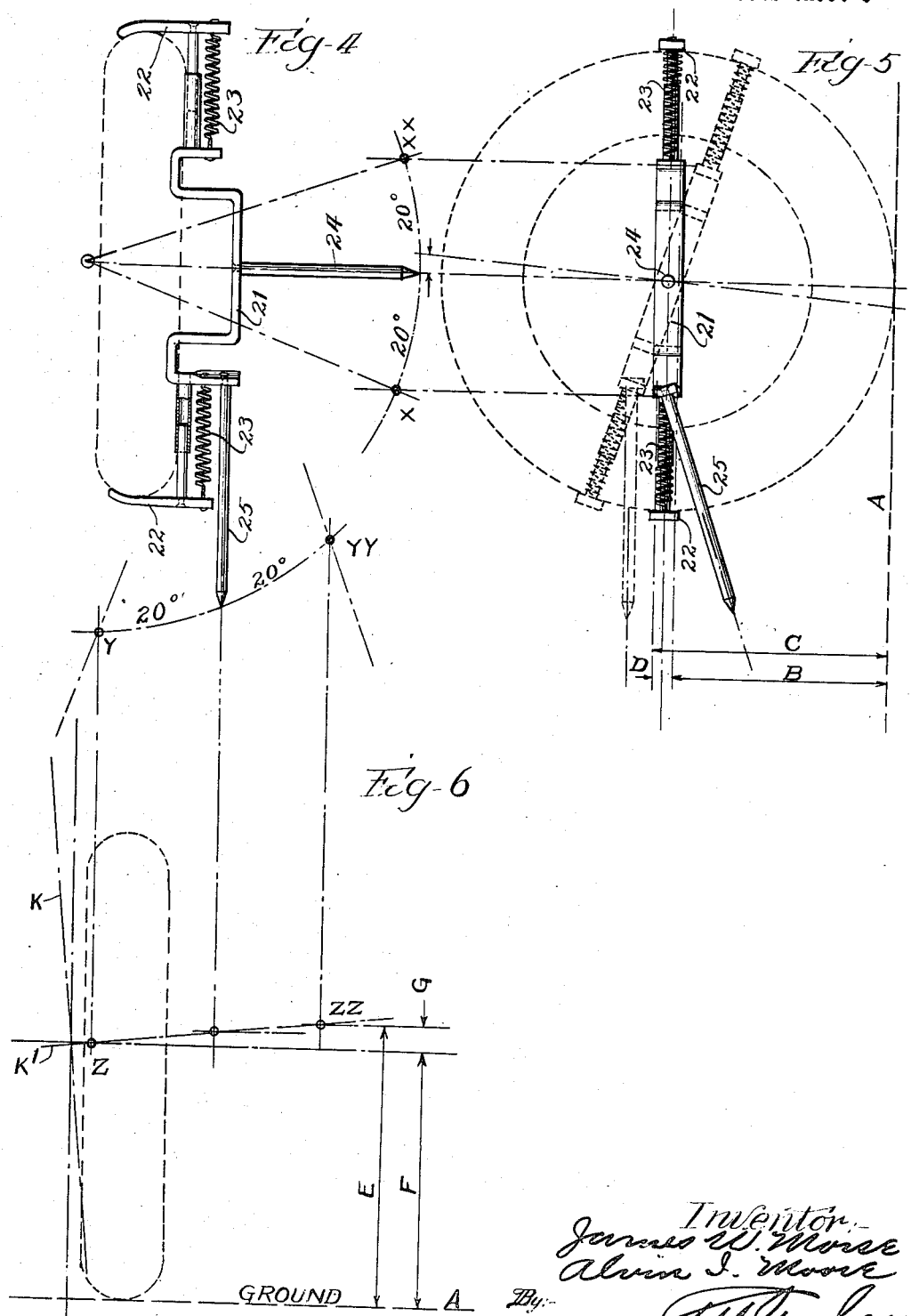

Patented July 7, 1936

2,046,528

UNITED STATES PATENT OFFICE 2,046,528

AUTOMOBILE WHEEL ALIGNING DEVICE

James W. Morse and Alvin I. Moore, Lansing, Mich., assignors to Food Machinery Corporation, San Jose, Calif.

Application December 31, 1929, Serial No. 417,740
Renewed November 26, 1935

10 Claims. (Cl. 33—203)

This invention relates to a device for aligning or for checking the alignment of the front wheels of automobiles as relates to what is technically known as camber, caster, king pin inclination, toe in on the straight away and toe out on the curves, and comprises a simple manually operated apparatus for easily and quickly determining the above factors or for indicating wherein they may vary from desired standards and thereby point the way to remedy the discrepancies.

It might be well at the start to define the various conditions we are going to deal with so that a clear understanding of the exact meaning of the technical terms used will be had.

Camber is the amount, measured in inches or degrees, that the front wheels are inclined outward at the top. Its purpose is to give ease in steering.

Caster is the amount, usually measured in degrees, that the king pin is inclined backward at the top. Its purpose is to stabilize the steering of the car.

King pin inclination is the amount, usually measured in degrees, that the king pin is inclined inward at the top. Its purpose is to give ease in steering and the absorption of road shocks.

Toe in on the straight away is the amount, usually measured in inches that the front wheels toe in at the front. This factor is made necessary by camber and is directly related to it.

Toe out on the curve is the difference between the angles through which the front wheels of a car are turned when the car is rounding a curve. It is dependent on the wheel base of the car, the amount of camber and caster and the radius about which the car is turning.

Besides checking and indicating the manner of correcting the factors mentioned this invention is adapted to indicate the making of other corrections in connection with the adjustment of the front wheels of automobiles as will be pointed out in the following description.

Broadly considered the invention comprises a trackway onto which an automobile is driven with the front wheels adjacent a cross member forming a part of the trackway, jacks or other suitable means are then employed to elevate the front wheels so they may be moved in all directions without restriction. Right and left hand indicating and recording devices are then manually placed along the top surface of the mentioned cross member and adjusted to the front wheels of the car. Contact members form a part of the apparatus for engaging the outer sides of the wheels to indicate on a suitable scale in inches or degrees the amount the wheels are inclined outward from a vertical line which indicates the camber of the wheels. This part of the apparatus is universal in measuring the camber of the front wheels of all makes of automobiles. We have found that very few of the many different makes have the same amount of camber, caster, etc., but believe that any one or all of them may be correct for the exact conditions of design and operation of the individual cars, we therefore designed this apparatus to indicate the camber of different cars and to make it universally adaptable to this line of investigation.

The caster of the wheels is determined by clamping an indicating device to the front wheels in turn and determining by means of a pointer the difference in elevation thereof when the wheel is turned through a predetermined angle to the right and left of the straight ahead position.

The king pin inclination is determined in a similar manner to that of the caster.

Toe in is measured by having the wheels in the straight ahead position and the amount of toe in of each wheel is indicated in inches on a suitable scale forming a part of the apparatus.

Toe out on the curve is measured by first turning the wheels for a right hand curve by turning the left front wheel through a predetermined angle indicated on a suitable sector scale, the right hand tester then placed against the right front tire will give readings on a suitable sector scale that will vary more or less according to the wheel base of the car being checked.

The king pin inclination and the toe out measurements are easily determined by the use of suitable charts which will be fully explained.

It of course will be quite obvious that all of the factors being discussed are interrelated and mutually dependent on each other. When one is changed the others must change if the steering geometry is to be maintained correct. It is also obvious that the different manufacturers may adopt different sets of conditions for their cars and all be correct for those cars, hence the necessity of a universal apparatus.

Over 50% of a car's travel is done on curves of varying radii. When a car is rounding a curve the front wheels are turned through different angles, the amounts of which will vary with the wheel base of the car and the radius of the curve about which the car is turning. Therefore it is absolutely necessary to have a check on the amounts of these angles if a 100% front wheel alignment is to be arrived at and maintained.

If these conditions are not 100% correct and so maintained various shimmies are set up during the operation of the car that will affect its ease and safety of operation to a very material extent. For example the car may shimmy at slow speed which is caused by excessive caster or a twisted front axle; by loose tie rod and king pin bearings; or may occur from snubber straps that are fastened to long arms extending out from the axles. The remedy for this is to reduce the caster a degree or more.

Again cars may shimmy only at high speeds which may be caused by certain conditions of tire adjustment and may be caused by too much caster or unequal amounts of caster in the two front wheels.

The wear on the front wheel tires is very much influenced by the conditions of adjustment of the front wheels. Some tires cup on both sides which is excessive wear in spots around the side peripheries. This is usually caused by excessive camber, or it may be the combined cause of excessive camber, too much toe in on the straight away and too much toe out on the curves. Readjusting these factors of operation will usually remedy the trouble.

Other tires show excessive smooth wear on the inside. This is usually remedied by reducing the toe in.

Other tires show excessive smooth wear on the outside. This is usually caused by too much toe out on the curves indicating bent spindle arms. The remedy is to reset the spindle arms and then by a proper test readjust the toe out of the wheels to suit the particular wheel base of that car.

To run a car onto the testing platform afflicted with any of the defects enumerated and apply testing and indicating devices that will give quick and accurate visual indications of the causes of the troubles and be able to apply the proper remedies immediately is what this invention has been developed to do.

It is therefore a principle object of the invention to provide a portable unitary apparatus for checking the various alignments of automobile wheels and to be universal in character so as to be applicable to all makes of cars and all conditions of proper and improper adjustments.

It is also an object of the invention to provide an apparatus that will give quick accurate reading of the camber of front automobile wheels.

It is also an object of the invention to provide an apparatus that will give quick and accurate reading of the caster of front automobile wheels.

It is also an object of the invention to provide an apparatus that will give quick and accurate reading of the king pin inclination of automobile steering and wheel mounting apparatus.

It is also an object of the invention to provide a quick and easily read indication of the toe in of front automobile wheels.

It is also an object of the invention to provide a quick and easily read indication of the proper or improper toe out of front automobile wheels when the car is rounding a curve.

It is also an object of the invention to provide a chart to be used with the apparatus when checking the king pin inclination whereby the measures determined by the apparatus in inches will indicate on the chart the degree of inclination of the king pin.

It is also an object of the invention to provide a chart to be used with the apparatus when the degree of caster of the front wheels are being checked or determined whereby the indications given by the check will transpose the measurements into degrees of caster.

It is also an object of the invention to provide a chart to be used in connection with the tests for toe out on the curve whereby when the front wheel on one side is turned a specific amount in degress the chart will indicate in degrees the angle to which the other wheel should be set to have the conditions of operation according to standard, and according to the wheel base of the car being tested or aligned.

It is also an object of the invention to provide visual scales as an indication of the conditions encountered in the various tests applied.

With such objects in view as well as other advantages inherent in the invention, the novel structural peculiarities, novel organization of elements and the separate and collective operations involved in carrying out the recited objects of the invention, which will be made the subject matter of claims hereto appended, we wish it understood that the several necessary elements and combinations constituting the same may be varied in their proportions, placement, general arrangement and operative relations without departing from the scope and nature of the invention.

In carrying out the objects of the invention in a concrete form of apparatus, further objects, advantages and improvements have been evolved than have been recited, and in order to make the invention more clearly understood there are shown in the accompanying drawings means and mechanism embodying the preferred disposition of the different parts and combinations, in which we have simply illustrated one way of embodying the creative part or concept of the invention. The described devices are simply embodiments of the invention which other structures might also employ and some of the parts or combinations of parts may be used without the others in different types of such apparatus without departure from the purview of the invention and we therefore regard ourselves as entitled to such variations from the shown and described devices as fall within the scope and meaning of the claims hereto appended.

The drawings that have been prepared to illustrate the application of this invention to an operative device have been made with a view of portraying the various operations in a manner that would best illustrate the inventive thought without confining the showing to an exact scale or dimension. The operative features may be more or less diagrammatic; some parts may be more or less out of relative proportion, and the engineering features of construction may be somewhat at variance with the best or preferred practices in the making of apparatus of this type. With this thought in mind we may now proceed with a description of the several views of the drawings and then with a more detailed description of the construction and operation of the invention.

Figure 1 represents a front elevation of an automobile with the front wheels and axle in full lines and the rest in dotted outline. This view clearly shows a front view of the trackway and cross member onto which the car is driven; the jacks that have been placed under the front axle to elevate the wheels from the trackway and the right and left hand apparatus as applied to the wheels to determine the various factors we have mentioned.

Figure 4 is a plan view of an automobile wheel in dotted lines with that part of the apparatus applied thereto whereby the caster and king pin inclination of the wheel is determined. The dotted wheel is shown as a direct top view which is not technically correct but sufficiently so for this illustration. The wheel should show a camber but that would necessitate a perspective view of the wheel in dotted lines and was thought to be confusing. In considering the operation of this part of the apparatus it should be kept in mind that the test is being made with a wheel having the proper camber.

Figure 5 is a side view of Fig. 4 and shows the apparatus in full lines in the position of Fig. 4 and in the dotted lines the exact position of the parts when making the test for the settings desired to be found.

Figure 6 is merely an extension of Fig. 4 showing in diagram by dotted lines the extent of movement of one of the indicating pointers during the making of the tests.

Figure 7 is a diagram of the chart used in connection with determining the caster of the wheels.

Figure 8 is a diagram of the chart used in determining the king pin inclination.

Figure 9 is a diagram of the chart used in determining the turning radius and setting of the wheels in the toe out tests.

Figure 10 is an enlarged detail view of the horizontal scale sector showing the graduations thereon.

Figure 1:
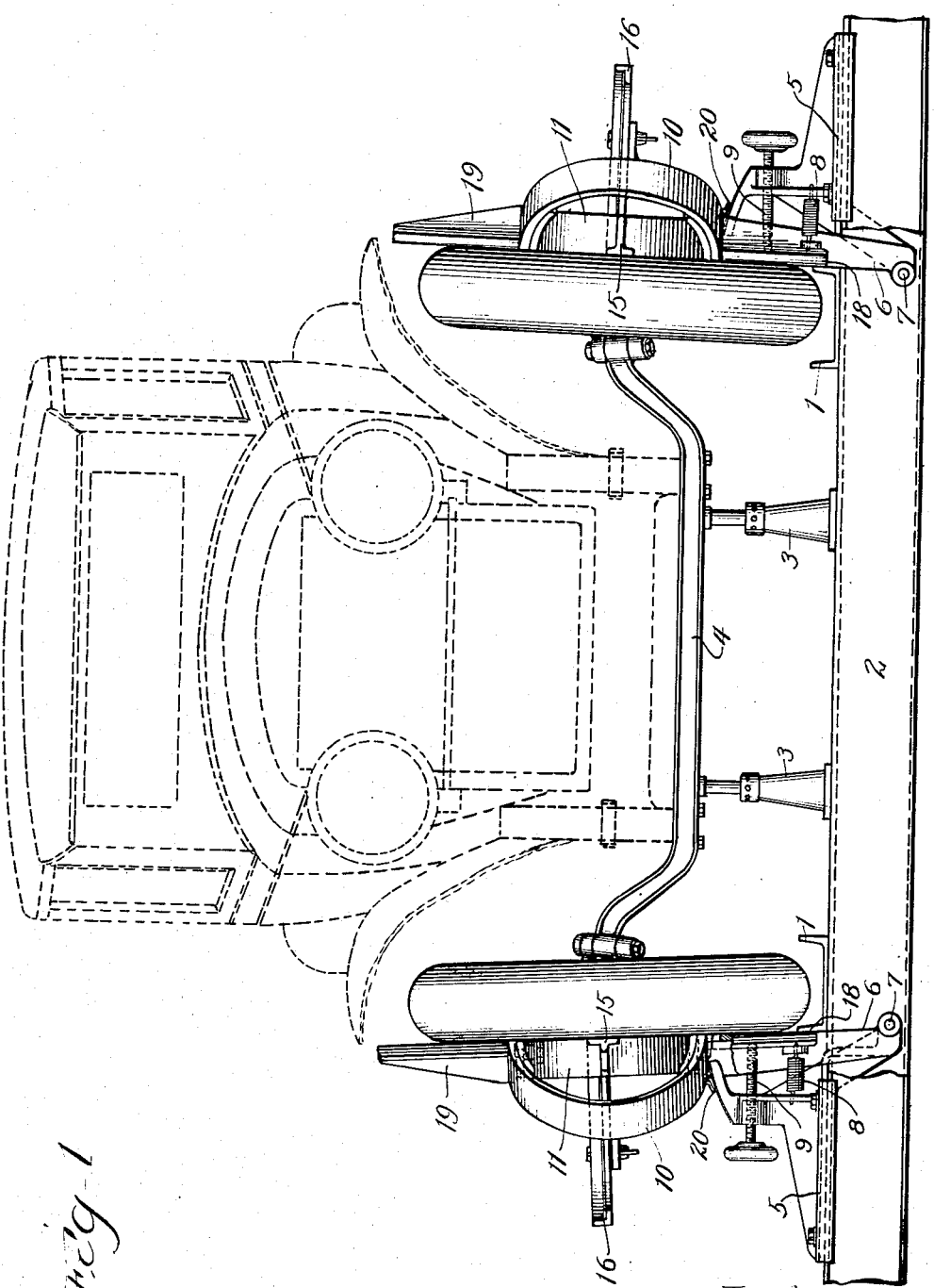

Beginning with Fig. 1, the numeral 1 indicates the track members onto which the automobile is driven, 2 is the front cross member supporting the tracks 1 and which also support the aligning and testing apparatus. 3 represents the jacks for elevating the car through being placed on the cross member 2 and under the front axle 4.

The testing apparatus comprises a right and left hand device which are substantially duplicates in construction and consists of the following elements, the same character designating the same part in each apparatus. 5 is a base member carrying the operative elements and is adapted to slide along the top surface of the cross member of the track 2.

Figure 2:
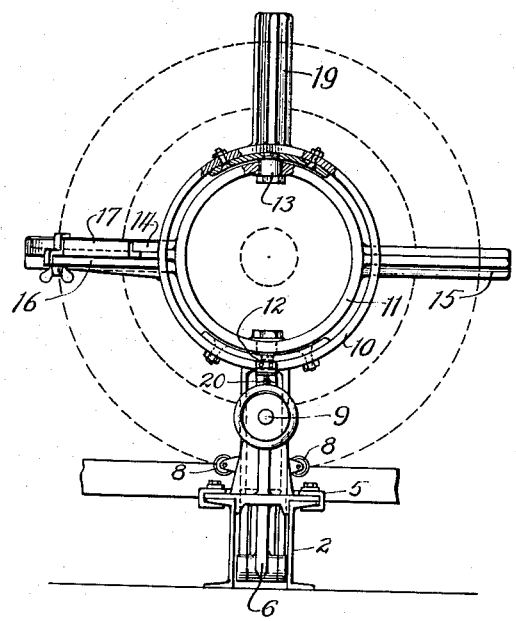
Figure 2 is a side elevation of the checking apparatus as applied to the side of one of the front wheels, the wheel being dotted in outline to show the relation of the apparatus to the wheel. No other part of the automobile is shown in this view.
Figure 3:
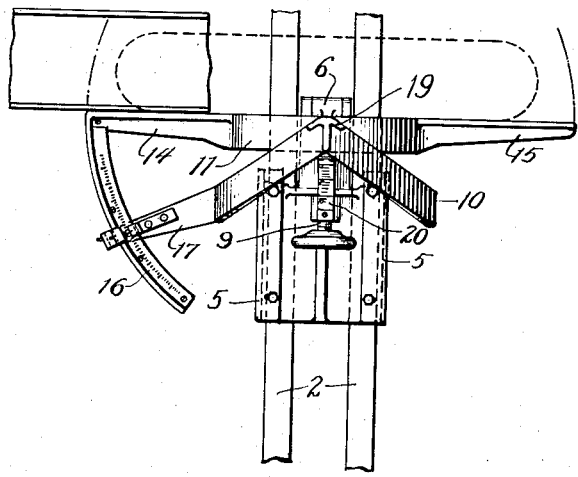
Figure 3 is a plan of Fig. 2 and shows quite clearly the arrangement of the various parts of the apparatus as they would appear from above.

The indicating part of the apparatus comprising the elements shown in Figs. 2 and 3 consists of a vertically disposed supporting arm 6 pivoted to the base member 5 at 7, held in operative position by the coiled spring 8 and controlled in its movement by the hand screw 9. The arm 6 carries a circular portion 10 which is of V form in vertical projection as is best seen in Fig. 3. Pivoted in this circular V shaped portion is another member having a circular portion fitting loosely within the member 10, this is indicated at 11. The two pivots 12 and 13 are placed in vertical relation so that the member 11 will swing through a horizontal plane on a vertical axis. The member 11 has two radial arms 14 and 15 which bear against the front and rear outsides of the tire in a substantially horizontal plane for determining the toe in angularity when the wheel is set straight ahead, and this amount is indicated visually on the scale 16 carried by the arm 14 and the indicator 17 carried by the member 11. The arms 18 and 19 carried by the member 10 constitute indicating devices bearing against the top and lower outsides of the tires to determine the camber of the wheels which is indicated on the scale 20 Figs. 1, 2, and 3.

To determine the king pin inclination the part of the apparatus shown in Figs. 4 and 5 is used. This comprises a member 21 carrying the clamping fingers 22 which engage the sides or rim of the tire front and back and which are held in clamping position by the springs 23. The member 21 carries two indicating pointers 24 and 25 which are manipulated in a manner that will be described in the operation portion of the specification.

The various elements of the apparatus have now been sufficiently described and indicated by proper characters so that the rest of the description will be better understood by following through the operative step of checking the wheel adjustments of an automobile.

An automobile having been run onto the platform and elevated by the jacks as shown in Fig. 1 the operator takes, say, the left hand apparatus looking at the front of the automobile into Fig. 1 and shoves it against the front wheel manipulating the hand wheel operating the screw 9 until the arms 18 and 19 bear equally against the top and bottom sides of the tire, when this adjustment has been completed a reading on the scale 20 will indicate in degrees the camber of the wheel. The same operation is then applied to the other wheel with the companion apparatus and the degree scale examined to see if the camber of this wheel is the same as the first one tested.

If they do not correspond they should be adjusted until they do, and it may be necessary to adjust both to a predetermined standard.

At the same time that this adjustment is being checked the adjustment for toe in is being tested. The placing of the apparatus against the side of the wheel as has been described and adjusting the vertical arms 18 and 19 also brings the lateral arms 14 and 15 against the sides of the tire as in Figs. 2 and 3 which will indicate on the portion of the scale reserved for this reading at 16 the toe in of the wheel. This reading of course should correspond on both wheels, if it does not then the wheels should be adjusted to read alike and to some predetermined standard according to the particular automobile being tested.

The king pin inclination test requires the addition of the device of Figs. 4 and 5 which is clamped to the wheels as shown. This device cooperating with the main apparatus determines the amount the king pin inclines backward at the top which is called the caster of the wheel, and the inclination of the king pin inward at the top which is given to permit of easy steering.

The caster will be determined first. This is found by turning the wheel to place the pointer 25 in a horizontal position as is shown by dotted lines in Fig. 5 and the wheel then placed so the pointer 24 extends at substantially at right angles from the side of the wheel when set straight ahead. The pointer 24 is now moved say, 20° to the point X Fig. 4 which will move the pointer 25 to the point Y and on account of the inclination of the king pin will carry it down from a horizontal plane to substantially the point the position of Fig. 4 which is central to the position Z which may be called a dimension F measuring from the ground line. The pointer 24 is now moved to the 20° position XX which will move the pointer 25 to the position YY which will elevate the point above normal as at ZZ which may be called a dimension E determined from the ground line to the point ZZ. The difference between E and F represents in inches a difference in the elevation of the pointer 25 in the two extremes of movement and may be represented by the dimension G. For example we will say it measures ¾ of an inch. By reference now to the caster chart Fig. 7 it will be noted that at ¾ of an inch the diagonal line crosses the vertical of about 2 and 6/10 degrees which is the inclination of the king pin indicating the caster of the wheel. This same operation also determines the king pin inclination at the top by transferring the reading to the king pin inclination chart Fig. 8 where it will be seen that ¾ of an inch for the dimension G will cross the diagonal at the 1¾ degree vertical which is the king pin inclination.

The line K in Fig. 6 represents the king pin inclination. The line KI at right angles thereto is the path of movement of the pointer 25 as it is traversed through the 20° movements referred to and this line KI represents the rise and fall from horizontal as the pointer is moved.

The next test to be made is to determine if the toe in of the two front wheels are uniform and the proper amount.

This reading is found by placing both wheels in the straight ahead position which will move the sector scale 16 on each the right and left hand devices at certain readings on the sector to coincide with the indicator 17. A portion of the sector is set off to take care of these readings which will be seen clearly in Fig. 10 which is marked to indicate the points at which the various readings are taken during the making of the different tests.

The next test to be made is the toe out on the curve. This is done by first turning the wheels for a right hand curve. The left front wheel is turned through an angle of 20° measured on the left sector scale. The right hand tester will then be pushed up and adjusted until all four arms touch the right front tire. The reading on the right hand sector should be 24° if the wheel base of the car is 100 inches, or 23° if the wheel base is 127 inches.

The chart shown in Fig. 9 was made to indicate the proper toe out degrees for a car of any wheel base and shows by the diagonal line the proper degree toe out for the right hand wheels when the left hand wheel has been moved 20°. This setting of the wheels is dependent on the wheel base of the car, the amount of camber and caster and the turning radius.

During the foregoing description we have spoken at times of making the necessary adjustments to correct or bring the various parts into proper relation to give the desired conditions. These adjustments may sometimes be merely the lengthening or shortening of the drag link, tightening up loose tie rods or correcting loose king pin bearings, wheel bearings may need adjustment, snubber straps or cables may need adjustment, different pressures may be needed in the tires, sometimes the front wheels are out of balance and need balancing to remove some trouble.

Wheels that have excessive or not enough camber, caster or toe-in can sometimes only be adjusted by bending either the front axle or the steering arms on the wheels or some other part of the front wheel construction. After the trouble has been located by the tests just described through the use of our improved apparatus the remedy can be applied in such manner as is most expedient and practical.

Having described the invention what is claimed as new is:

1. An apparatus for determining the camber and toe-in alignments of front automobile wheels comprising a pair of members for contacting with the outside surfaces of the said front wheels, and a base member for supporting the pair, one of said pair having pivotal connection with the base member for vertical determination, the other of said pair having pivotal connection with the first of said pair for horizontal determination with indicating devices carried by said pair of members for giving a progressive reading of said alignments and changes made thereto.

2. An apparatus for determining the toe in of automobile wheels in the straight away position comprising means for establishing a base line, carriages movable along said base line toward and away from wheels positioned relative to said base line, alignment members one of which is pivoted to each carriage and carried thereby into and out of contact with said wheels, means for adjusting said alignment members to said wheels in a vertical plane, one of said alignment members being pivoted to the other and cooperating therewith for contacting with the front and back sides of the wheels in a horizontal plane for indicating the toe in of the front sides of the wheels and a scale for giving a reading in inches of said toe in.

3. A device for ascertaining the camber and toe-in of automobile wheels comprising a support for an automobile, means for elevating the front wheels of the automobile when on said support, a camber gauge riding along said support for contacting with the outside surfaces of said wheels, a toe-in gauge having pivotal connection with said camber gauge and carried thereby and adjusting means for setting said camber gauge against said wheels, a scale connected with said camber gauge indicating the degree of camber, the toe-in gauge automatically adjusting itself against the wheel to determine the toe-in thereof when the camber gauge is set to determine the camber thereof with a scale carried by said toe-in gauge to indicate the toe-in of said wheels in inches.

4. A device for ascertaining the camber and toe-in of automobile wheels comprising a support for an automobile, means for elevating the front wheels thereof, a camber gauge riding along said support for contacting with the outsides of said wheels and having adjustment for camber indication only, a toe-in gauge pivotally mounted on said chamber gauge and having adjustment for toe-in only, the said toe-in gauge automatically indicating the toe-in of the wheel at the same time that the camber gauge indicates the camber of the wheel, the adjustment to determine the camber making no change in the indication for toe-in by the toe-in gauge.

5. A device for determining the camber and toe-in of automobile wheels comprising a support for the automobile, means for elevating the front wheels thereof, a camber gauge riding along the support for contacting with the top and bottom surfaces of a front wheel, means for adjusting the gauge to touch the said top and bottom surfaces and an indicating gauge cooperating therewith to indicate the degrees of camber on a visible scale, a toe-in gauge carried by said camber gauge, pivotal mountings therefor to permit said gauge to swing in a substantially horizontal plane with a free movement whereby as the said camber gauge is adjusted to a wheel the toe-in gauge automatically indicates the toe-in of the wheel in inches with a visible scale for indicating said toe-in.

6. A device for determining the camber and toe-in of automobile wheels comprising a support for an automobile, means for elevating the front wheels of said automobile while on said support, a camber gauge riding along said support and having a horizontal pivot connection thereto, the said pivot being located below the line of said support, a toe-in gauge carried by said camber gauge and being supported thereon by a vertically disposed pivot connection whereby as said chamber gauge is adjusted to a wheel to determine the camber the toe-in gauge automatically indicates the toe-in of said wheel without individual adjustment.

7. A device for determining the camber and toe-in of automobile wheels comprising a support for an automobile, means for elevating the front wheels while on said support, a carriage slidable along said support, a camber gauge supported by said carriage and movable thereon, a horizontal pivot attaching said camber gauge to said carriage, so that said camber gauge is capable of adjustment for camber only, a toe-in gauge carried by said camber gauge and movable independently of said camber gauge and attached thereto by a vertical pivot whereby said toe-in gauge is adjustable for toe-in indication only, with visual indicating means for indicating the camber in degrees and the toe-in in inches.

8. A device for ascertaining the camber and toe-in of automobile wheels comprising a support for an automobile, means for elevating the front wheels thereof while on the support, a carriage sliding along said support toward and away from said front wheels, a camber gauge carried by said carriage and having adjustment for indicating camber only, a toe-in gauge carried by said camber gauge and having adjustment for indicating toe-in only, the connection between said camber and toe-in gauges being such that when the camber gauge is adjusted to determine the camber of a wheel the toe-in gauge will automatically adjust to the wheel and indicate the toe-in of the wheel without individual manipulation.

9. A device for determining the camber and toe-in of automobile wheels comprising a support for an automobile, means for elevating the front wheels thereof, a carriage slidable toward and away from said front wheels in a predetermined fixed plane, a camber gauge mounted to move with said carriage and be adjusted to indicate the camber of a wheel with visual indicating means for indicating the camber in degrees, a toe-in gauge pivotally mounted on said camber gauge to move independent of said camber gauge to indicate the toe-in of the wheel at the same time the camber gauge indicates the camber thereof, the coaction between the said camber gauge and the toe-in gauge being such that the toe-in gauge indicates the toe-in of the wheels when the camber gauge is adjusted to indicate the camber of the same wheel.

10. An apparatus for determining the characteristics of the camber and toe-in alignments of automobile wheels comprising a pair of members having cooperative pivotal relation and adapted to simultaneously engage the sides of the front wheels of automobiles, a base member movable toward and away from said wheels, one of said pivotal pair having vertical swinging movement relative to said base member and the other of said pair being pivoted to the vertically swinging member of the pair and having swinging movement horizontally relative to the wheels.

JAMES W. MORSE.
ALVIN I. MOORE.